US010584685B2

(12) United States Patent
Brencher et al.

(10) Patent No.: US 10,584,685 B2
(45) Date of Patent: Mar. 10, 2020

(54) WIND TURBINE

(71) Applicant: Siemens Gamesa Renewable Energy A/S, Brande (DK)

(72) Inventors: Janina Brencher, Hannover (DE); Peter Decker, Hannover (DE); Niels Karl Frydendal, Herning (DK); Troels Kanstrup, Rask Moelle (DK); Dennis Olesen, Aarhus (DK); Thorsten Rohrmann, Binder (DE); Kim Thomsen, Skørping (DK); Morten Thorhauge, Aarhus (DK)

(73) Assignee: Siemens Gamesa Renewable Energy A/S (DK)

( * ) Notice: Subject to any disclaimer, the term of this patent is extended or adjusted under 35 U.S.C. 154(b) by 0 days.

(21) Appl. No.: 16/132,674

(22) Filed: Sep. 17, 2018

(65) Prior Publication Data

US 2019/0085832 A1 Mar. 21, 2019

(30) Foreign Application Priority Data

Sep. 20, 2017 (EP) ...................................... 17192168

(51) Int. Cl.
*F16C 17/06* (2006.01)
*F03D 80/70* (2016.01)
(Continued)

(52) U.S. Cl.
CPC .............. *F03D 80/70* (2016.05); *F16C 17/03* (2013.01); *F16C 25/04* (2013.01); *F16C 35/02* (2013.01);
(Continued)

(58) Field of Classification Search
CPC ....................................................... F16C 17/06
See application file for complete search history.

(56) References Cited

U.S. PATENT DOCUMENTS

| | | | |
|---|---|---|---|
| 1,754,324 A | 4/1930 | Kingsbury | |
| 2,225,835 A | 12/1940 | Howarth | |

(Continued)

FOREIGN PATENT DOCUMENTS

| | | | | |
|---|---|---|---|---|
| CN | 202074011 | | 12/2011 | |
| GB | 1495248 A | | 12/1977 | |
| WO | WO-2011003482 A2 | * | 1/2011 | ............. F03D 80/70 |

OTHER PUBLICATIONS

Non-English Chinese Office Action for Application No. 201811100777. X, dated Nov. 14, 2019.
(Continued)

*Primary Examiner* — Thomas R Hannon
(74) *Attorney, Agent, or Firm* — Schmeiser, Olsen & Watts LLP

(57) ABSTRACT

A wind turbine, including a support structure and a thrust bearing having a bearing pad which includes a piston and which is movably connected to the support structure, a spring element which is configured to resiliently support the bearing pad relative to the support structure, wherein a pad portion of the bearing pad and/or the bearing pad itself is configured to tilt and to move translationally relative to the support structure, and wherein a gap is provided between the piston and the support structure. The piston limits the movement of the bearing pad. Thus, reliable and well defined movement limits are provided. Furthermore, a broad spectrum of spring parameters is available since the movement may be restricted by the piston and not necessarily be the spring element.

10 Claims, 4 Drawing Sheets

(51) Int. Cl.
*F16C 17/03* (2006.01)
*F16C 35/02* (2006.01)
*F16C 25/04* (2006.01)

(52) U.S. Cl.
CPC ....... *F05B 2240/50* (2013.01); *F05B 2240/52* (2013.01); *F16C 2360/31* (2013.01)

(56) References Cited

U.S. PATENT DOCUMENTS

| | | |
|---|---|---|
| 2,778,696 A | 1/1957 | Lease |
| 3,160,450 A | 12/1964 | Gentiluomo |
| 3,829,179 A * | 8/1974 | Kurita ................. F04D 29/0413 384/224 |
| 5,876,125 A * | 3/1999 | Wyndorps ............... F16C 17/06 384/122 |
| 9,739,310 B2 * | 8/2017 | Dourlens ................ F16C 17/03 |
| 2011/0254281 A1 | 10/2011 | Noda et al. |

OTHER PUBLICATIONS

English Translation of European Search Report for Application No. 17192168.7, dated Nov. 26, 2019.

* cited by examiner

WIND TURBINE

CROSS-REFERENCE TO RELATED APPLICATIONS

This application claims priority European application No. EP17192168 having a filing date of Sep. 20, 2017, the entire contents of which are hereby incorporated by reference.

FIELD OF TECHNOLOGY

The following relates to a wind turbine.

Modern wind turbines typically comprise a tower, a nacelle which is connected to the tower, a hub which is rotatably connected to the nacelle, and blades which are connected to the hub. Further, typically a main shaft is provided which is fixed to the hub and which is connected to the nacelle by radial bearings and e.g. at least one thrust bearing to constitute a main bearing. Conventional wind turbines use roller or ball bearings for the main bearing. However, serviceability of the main bearing or a replacement of the main bearing normally requires an external crane. This type of service is very costly, especially for wind turbines located offshore.

BACKGROUND

WO 2011/003482 A2 shows a wind turbine main bearing configured to support a shaft of a wind turbine, which shaft is caused to rotate by a number of blades connected to the shaft, wherein the wind turbine main bearing comprises a fluid bearing with a plurality of bearing pads arranged around the shaft.

SUMMARY

An aspect relates to providing an improved wind turbine.

Accordingly, a wind turbine comprising a support structure and a thrust bearing is provided. The thrust bearing comprises a bearing pad which comprises a piston and which is movably connected to the support structure, a spring element which is configured to resiliently support the bearing pad relative to the support structure. A pad portion of the bearing pad and/or the bearing pad itself is configured to tilt and to move translationally relative to the support structure. A gap is provided between the piston and the support structure.

Preferably, the wind turbine comprises a tower, a nacelle which is rotatably connected to the tower, a hub which is rotatably connected to the nacelle, blades which are connected to the hub, and a main shaft which is rigidly fixed to the hub and which is connected to the nacelle by two radial bearings and one or two thrust bearings to constitute a main bearing. Preferably, a rotor of a wind turbine's generator is rigidly connected to the main shaft. Preferably, the support structure is rigidly connected to the nacelle. The support structure may comprise a thrust bearing seat supporting the thrust bearing.

The bearing pad is configured to move relative to the support structure. The piston preferably comprises a longitudinal and/or central axis, wherein the translational movement of the bearing pad occurs along the longitudinal and/or central axis. Preferably, the pad portion and/or the bearing pad tilts relative to the longitudinal and/or central axis of the piston when the piston is in a central position. A maximum tilt angle of the pad portion and/or the bearing pad relative to the central position of the piston and/or the pad portion and/or the bearing pad may be between 0.5 and 2°, 1.5 and 3°, 2 and 5°, 3 and 10°, 5 and 15°, 10 and 20°, or 15 and 30°. The thrust bearing preferably comprises a plurality of bearing pads, wherein the bearing pads are arranged circular to form a circle. The bearing pads may comprise first friction surfaces interacting with a lubricant. Further, a second friction surface of the thrust bearing may be arranged opposite to the first friction surfaces. The second friction surface may be part of the main shaft or a component (e.g. a ring) stiffly fixed to the main shaft. Preferably, each piston is averted from the corresponding first surface and/or the second friction surface. A "friction surface" can be also seen as a sliding surface.

The thrust bearing may be realized e.g. as a fluid bearing, in particular a hydrostatic bearing. A fluid bearing is a bearing that supports a load entirely on a thin layer of lubricant, usually oil. The bearing pad may comprise a number of cavities located on the respective first friction surface of the bearing pad, wherein a cavity comprises a fluid inlet for the injection of a fluid lubricant to the first friction surface and the second friction surface. In this way, the lubricant can be injected under very high pressure forcing a layer of lubricant between the first friction surfaces and the second friction surface and allowing the main shaft to rotate relative to the nacelle under low friction even at the start of the rotation. Preferably, a radial gap between the piston and the spring element is provided.

The advantages of the wind turbine are the following. A serviceability of the main bearing is simplified since bearing pads are used which have an improved manageability. Further, the piston limits the movement of the bearing pad. Thus, reliable and well defined movement limits are provided. Furthermore, e.g. a broad spectrum of spring parameters is available since the movement may be restricted by the piston and not necessarily be the spring element. Moreover, tilting of the pad portion and/or the bearing pad is improved.

According to an embodiment, the size and/or form of the gap varies depending on the movement of the pad portion and/or the bearing pad.

Preferably, in case of an isolated translational movement of the bearing pad towards the support structure a gap width decreases. Alternatively, in case of an isolated translational movement of the bearing pad towards the support structure a gap width may be constant. Preferably, in case of a tilt, in particular an isolated tilt, of the bearing pad relative to the support structure a gap form or form of the gap varies. Preferably, in case of a tilt, in particular an isolated tilt, of the pad portion relative to the piston a form of the gap may be unchanged. This has the advantage that a movement of the piston can be ensured.

According to a further embodiment, the movement of the pad portion and/or the bearing pad is limited by means of the piston and/or the gap.

Preferably, a size of the piston defines the size and form of the gap in central position (tilt angle is 0°) of the bearing pad. In case of a high load at the first surface of the bearing pad the piston may be moved towards the support structure until attaching the same such that the gap disappears. This has the advantage that a movement of the piston can be prevented in case of exceeding certain limits.

According to a further embodiment, the spring element surrounds the piston.

Preferably, the spring element is circular ring-shaped. This has the advantage that a compact arrangement between the piston and the spring element may be provided.

According to a further embodiment, the spring element comprises a coil spring and/or a disc spring and/or a polymer element.

Preferably, the spring element is a coil spring or a disc spring or a polymer element. This has the advantage that an optimal spring rate can be chosen.

According to a further embodiment, the piston comprises an end face facing the gap, wherein the support structure comprises a surface which faces the gap and is arranged opposite to the end face of the piston, and wherein the end face of the piston has a curved shape which is configured to roll and/or slide on the surface of the support structure during tilting of the bearing pad relative to the support structure.

This has the advantage that optimized rolling and/or sliding characteristics may be achieved such that reliable tilting of the bearing pad is ensured. Preferably, the end face has a spherical-calotte-shape.

According to a further embodiment, the pad portion is configured to tilt relative to the piston.

Preferably, in this embodiment the piston is configured not to tilt relative to the support structure.

According to a further embodiment, the pad portion and/or the bearing pad comprises a concave element and a corresponding convex element, wherein one of the concave element and the convex element is configured to move, in particular to slide, relative to the other of the concave element and the convex element, when the pad portion and/or the bearing pad is tilted relative to the support structure.

Preferably, the convex element and the concave element have curved surfaces which are attached to each other. The curved surfaces may be spherical-calotte-shaped. The concave element may comprise a negative form of a curved portion of the convex element.

According to a further embodiment, the thrust bearing comprises a pretension portion which is rigidly fixed to the support structure, and wherein the bearing pad is pretensioned against the pretension portion by means of the spring element.

Preferably, the pretension portion is a plate limiting the movement of the bearing pad towards the second friction surface.

According to a further embodiment, the thrust bearing comprises a bottom portion which is arranged between and attached to the pretension portion and the support structure.

Preferably, the bottom portion is a plate or lid. The bottom portion may comprise a cut-out in which the spring element is at least partially accommodated.

According to a further embodiment, the wind turbine comprises connecting means or a connector(s), in particular screws, which protrude through the support structure and the bottom portion and which are fixed to the pretension portion.

This has the advantage that the bearing pad may be mounted and/or dismounted easily. Preferably, a thread for the connecting means or connector(s) is provided at the pretension portion.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
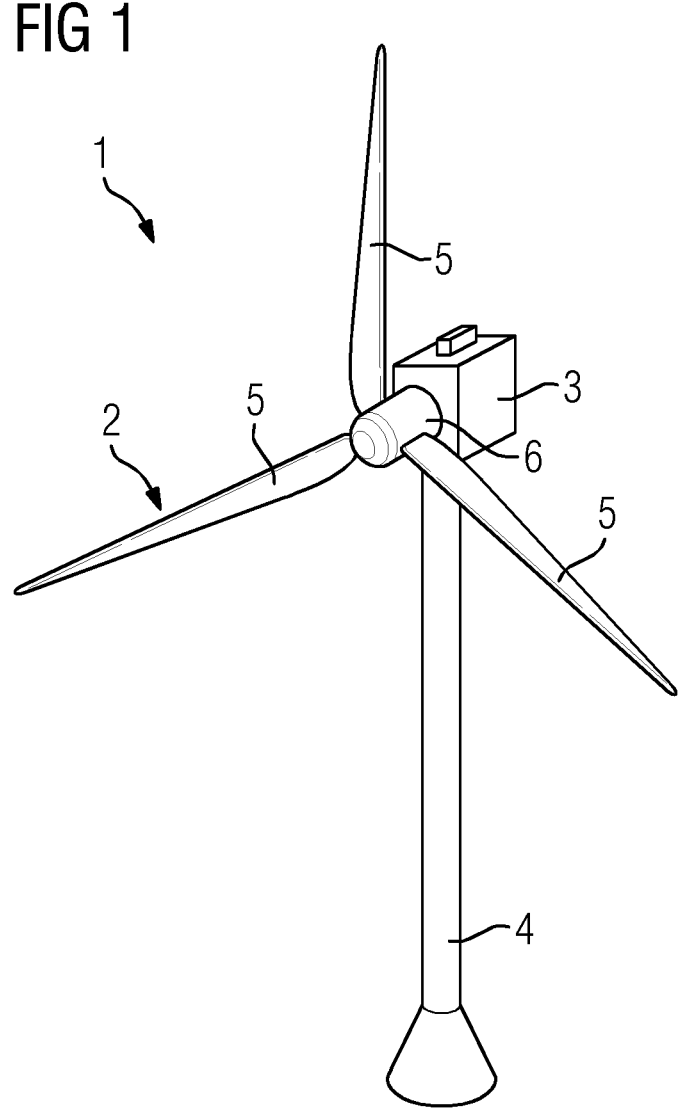
FIG. 1 is a perspective view of a wind turbine according to one embodiment.

In the Figures, like reference numerals designate like or functionally equivalent elements, unless otherwise indicated.

FIG. 1 shows a wind turbine 1 according to an embodiment.

The wind turbine 1 comprises a rotor 2 connected to a generator (not shown) arranged inside a nacelle 3. The nacelle 3 is arranged at the upper end of a tower 4 of the wind turbine 1. The nacelle 3 is rotatable connected to the tower 4.

The rotor 2 comprises three blades 5. The blades 5 are connected directly or indirectly to a hub 6 of the wind turbine 1. Rotors 2 of this kind may have diameters ranging from, for example, 30 to 160 meters or even more. The blades 5 are subjected to high wind loads. At the same time, the blades 5 need to be lightweight. For these reasons, blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

The wind turbine 1 further comprises a main shaft 9 (see FIG. 3) which is rigidly fixed to the hub 6 and which is connected to the nacelle 3. Preferably, a rotor (not shown) of a wind turbine's 1 generator (not shown) is rigidly connected to the main shaft 9.

Figure 2:
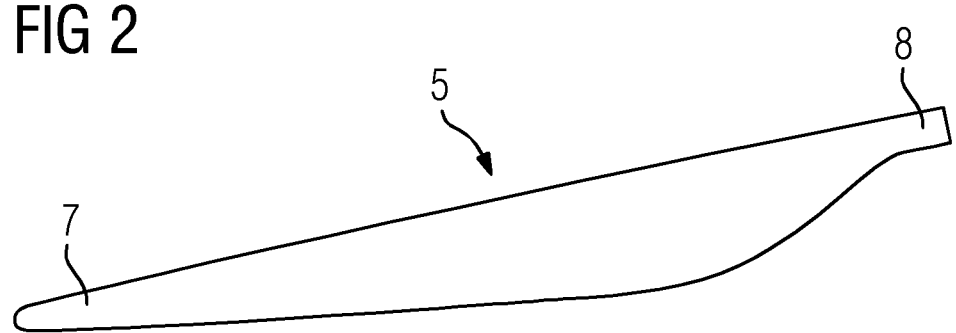
FIG. 2 is a perspective view of a wind turbine rotor blade according to one embodiment.

FIG. 2 shows a blade 5 according to one embodiment.

The blade 5 comprises an aerodynamically designed portion 7, which is shaped for optimum exploration of the wind energy and a blade root 8 for connecting the blade to the hub 6.

Figure 3:
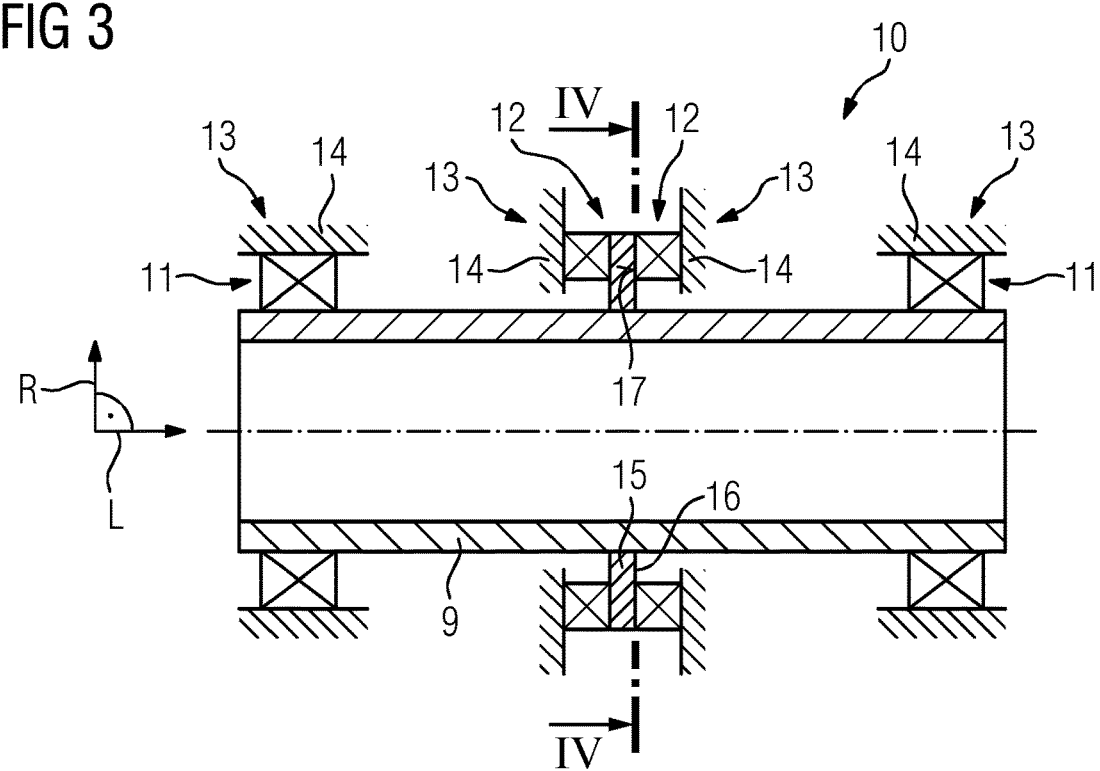
FIG. 3 shows a schematic cross-sectional view of a main shaft and a main bearing of the wind turbine according to one embodiment.

FIG. 3 shows a bearing arrangement 10 by which the hub 6 is rotatably supported relative to the nacelle 3 in a schematic cross-sectional view. The bearing arrangement 10 comprises the main shaft 9, two radial bearings 11 and e.g. at least one thrust bearing 12. The main shaft 9 is rotatably supported at the nacelle 3 (see FIG. 1) by means of the bearings 11, 12 which are connected to a support structure 13. Preferably, the support structure 13 is rigidly fixed to the nacelle 3. The support structure 13 may comprise bearing seats 14 supporting the bearings 11, 12. Preferably, the thrust bearing 12 is a hydrostatic bearing.

The thrust bearing 12 is configured to support axial forces acting in longitudinal direction L of the main shaft 9. The radial bearings 11 at least are configured to support radial forces acting in radial direction R of the main shaft 9 which is orthogonal to the longitudinal direction L.

Further, a ring 15 is rigidly connected to the main shaft 9. Preferably, the main shaft 9 and the ring 15 are a one-piece element. Alternatively, the ring 15 may be connected to the main shaft 9 by means of a connecting technic. The ring 15 comprises a friction surface 16 (also indicated as second friction surface of the thrust bearing). The thrust bearing 12 comprises a further friction surface 17 (also indicated as first friction surfaces) provided opposite to the friction surface 16. Between the friction surface 16 and the friction surface 17 a lubricant (not shown) is provided which reduces friction of the thrust bearing 12 when a relative movement between the friction surface 16 and the friction surface 17 occurs. The lubricant may be an oil and may be provided under high pressure between the friction surfaces 16, 17.

Figure 4:
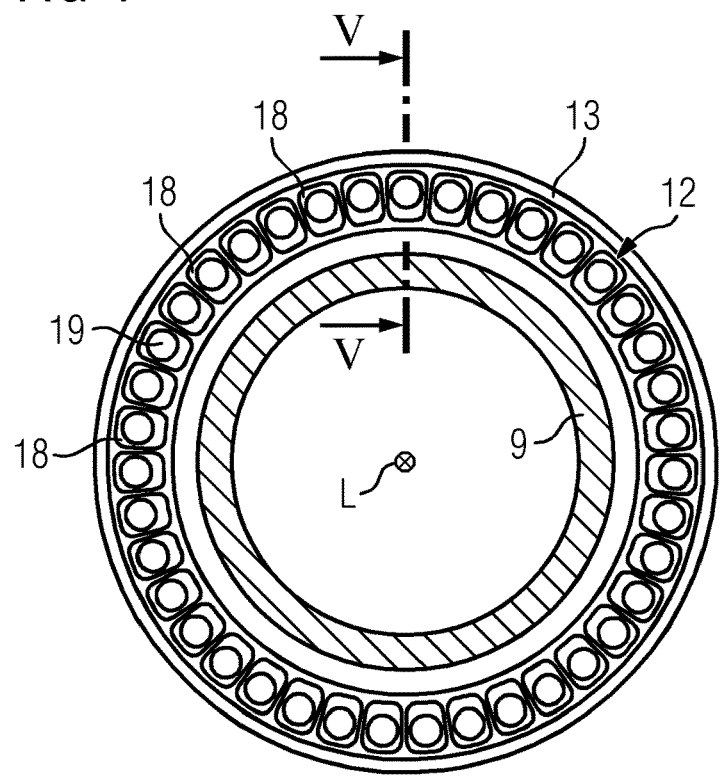
FIG. 4 shows a cross-sectional view IV-IV of FIG. 3.

FIG. 4 shows a cross-sectional view IV-IV of FIG. 3 when looking in a direction away from the ring 15.

The thrust bearing 12 comprises a plurality of bearing pads 18, wherein the bearing pads 18 are arranged circular to form a circle and the friction surface 17 (see FIG. 3). Each bearing pad 18 comprises a friction surface 19 which is comprised by the friction surface 17. Each bearing pad 18 is connected to the support structure 13.

Figure 5:
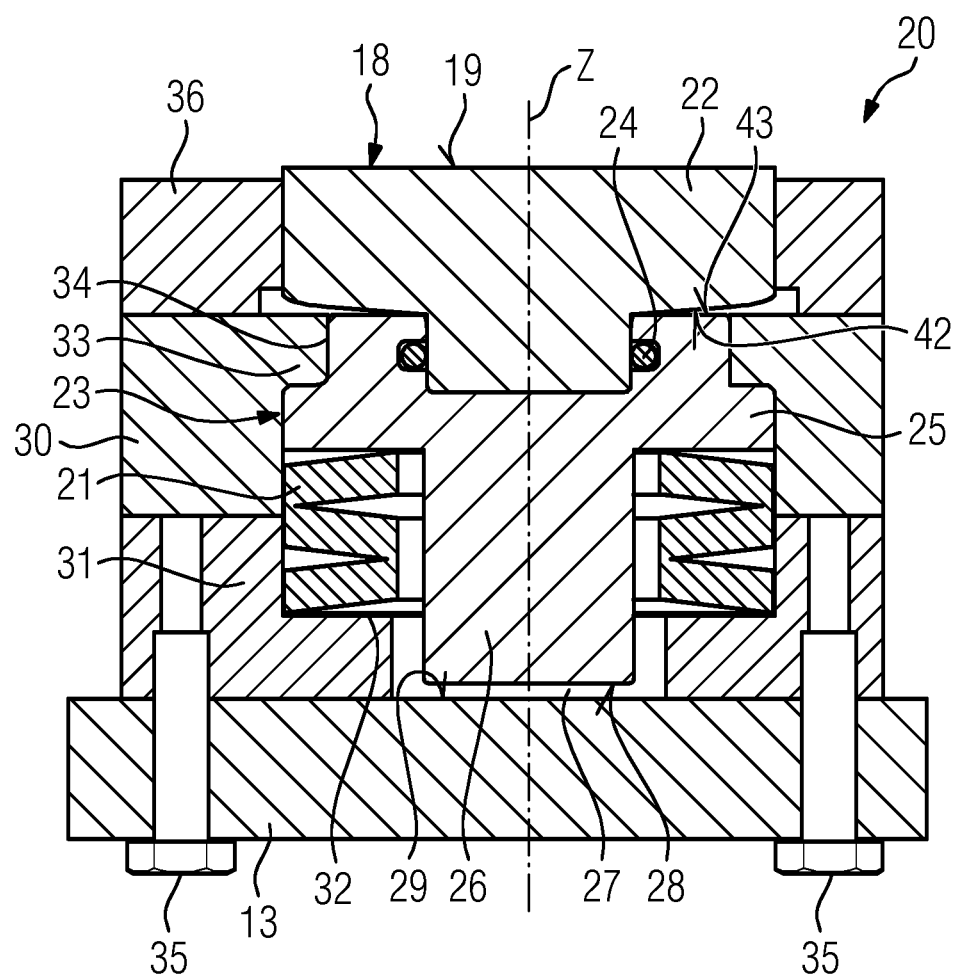
FIG. 5 shows a bearing portion in a schematic cross-sectional view V-V of FIG. 4.

FIG. 5 shows a bearing portion 20 in a cross-sectional view V-V of FIG. 4. The bearing portion 20 comprises the bearing pad 18 which is movably connected to the support structure 13, a spring element 21 which is configured to resiliently support the bearing pad 18 relative to the support structure 13. Preferably, the bearing pad 18 itself is configured to tilt and to move translationally relative to the support structure 13.

The bearing pad 18 further comprises a pad portion 22 comprising the friction surface 19 and a support portion 23 to which the pad portion 22 is connected by means of connecting means or a connector 24 (e.g. a retainer). Preferably, merely the pad portion 22 is configured to tilt relative to the support portion 23. The support portion 23 has a T-shaped cross-section and comprises a plate portion 25 and a piston 26 which are integrally formed. Preferably, the piston 26 is configured not to tilt relative to the support structure 13 when the pad portion 22 tilts relative to the support portion 23. The pad portion 22 may comprise a curved surface 42 which is averted from the friction surface 19 and which is configured to roll on a flat surface 43 of the plate portion 25. Alternatively, the piston 26 tilts relative to the support structure 13. The plate portion 25 is arranged between the piston 26 and the pad portion 22. A gap 27 is provided between an end face 28 of the piston 26 and a surface 29 of the support structure 13. The size and/or form of the gap 27 varies depending on the movement of the bearing pad 18. The end face 28 is averted from the friction surface 19.

The movement of the bearing pad 18 is limited by means of the piston 26 and/or the gap 27. The piston 26 preferably comprises a longitudinal and/or central axis Z, wherein the translational movement of the bearing pad 18 occurs essentially along the longitudinal and/or central axis Z. Preferably, the translational movement of the bearing pad 18 occurs orthogonal to the surface 29.

The thrust bearing 12 may comprises a pretension portion 30, in particular a pretension plate, which is rigidly fixed to the support structure 13, wherein the bearing pad 18 is pretensioned against the pretension portion 30 by means of the spring element 21. Further, the thrust bearing 12 may comprises a bottom portion 31, in particular a bottom lid, which is arranged between and attached to the pretension portion 30 and the support structure 13.

The spring element 21 has a ring-shaped cross-section, which surrounds the piston 26, and which is pretensioned between a cut-out 32 of the bottom portion 31 and the plate portion 25. The spring element 21 may be a coil spring or a disc spring or a polymer element. Further, an engaging element 33 of the pretension portion 30 engages into a cut-out 34 of the pretension portion 30 for limiting the translational movement of the bearing pad 18 towards the ring 15 (see FIG. 3). Moreover, a top portion 36 facing the ring 15 (see FIG. 3) which is attached to the pretension portion 30 and which surrounds the pad portion 22 may be provided.

Furthermore, connecting means or a connector 35, in particular screws, which protrude through the support structure 13 and the bottom portion 31 and which are fixed to the pretension portion 30 are provided.

Figure 6:
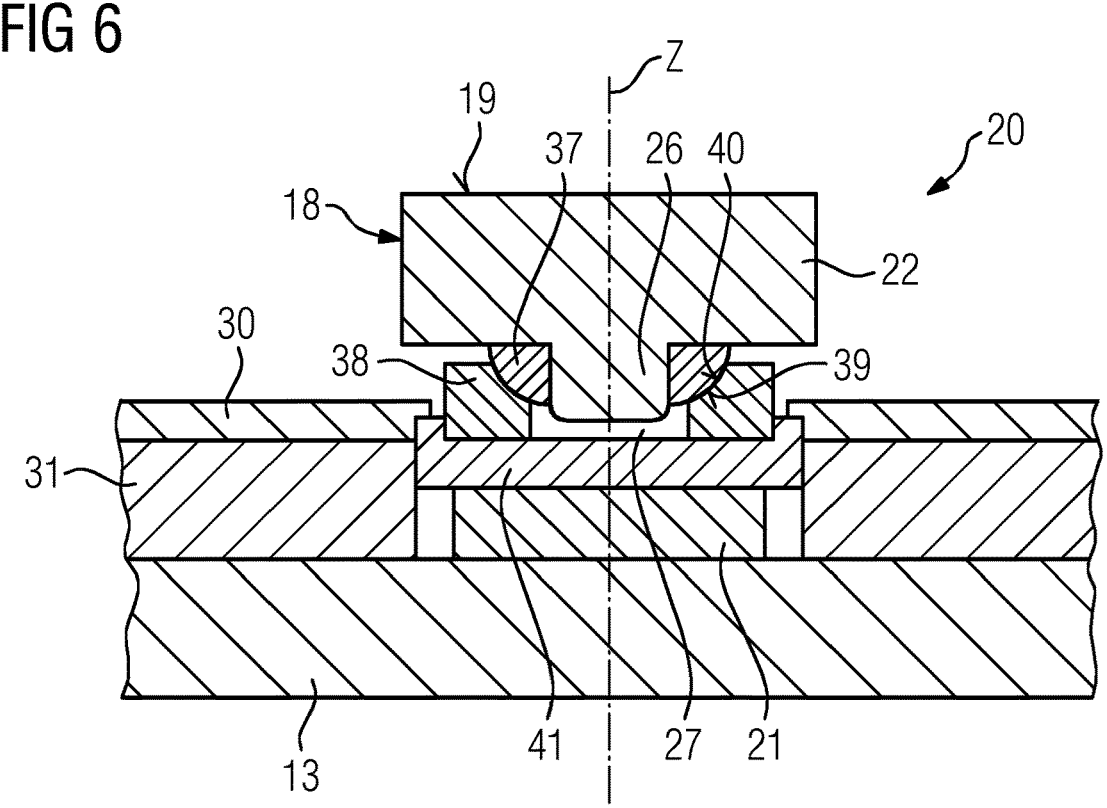
FIG. 6 shows a further embodiment of the bearing portion in a schematic cross-sectional view.

FIG. 6 shows a further embodiment of the bearing portion 20 in a schematic cross-sectional view.

The bearing pad 18 comprises a concave element 38 and a corresponding convex 37 element, wherein one of the concave element 38 and the convex element 37 is configured to move, in particular to slide, relative to the other of the concave element 38 and the convex element 37 when the bearing pad 18 is tilted relative to the support structure 13. The concave element 38 and the convex element 37 may be seen as a tilt mechanism configured to tilt the bearing pad 18 and/or the pad portion 22.

Further, the piston 26 is connected to the pad portion 22 or is integrally formed with the pad portion 22. Preferably, the piston 26 and pad portion 22 are a one-piece element. The convex element 37 surrounds the piston 26 and is fixed to the piston 26. The convex element 37 is ring-shaped. A curved surface 39 of the convex element 37 is attached to a curved surface 40 of the concave element 38 such that sliding between the surfaces 39, 40 is possible. The concave element 38 is merely indirectly connected to the pad portion 22 by means of the convex portion 37. The concave element 38 surrounds the gap 27 and is connected to a base plate 41 which supports the concave element 38. The gap 27 allows tilting of the pad portion 22.

Moreover, the spring element 21 is arranged between the base plate 41 and the support structure 13. Thus, tilt mechanism 37, 38 and spring element 21 which allows translational movement of the pad portion 22 are provided separately. The spring element 21 is pretensioned by means of the pretension portion 30 which limits a movement of the base plate 41 towards the ring 15 (see FIG. 3).

Figure 7:
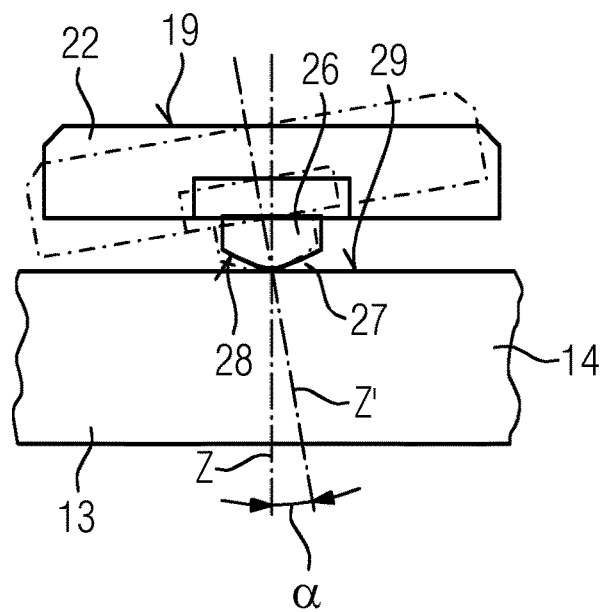
FIG. 7 shows schematically a tilt mechanism of one embodiment of a bearing pad.

FIG. 7 shows schematically a tilt mechanism of a further embodiment of the bearing pad 18. FIG. 7 is shown without a spring element. However, the spring element may be provided in accordance with FIG. 5 or 6. Tilting of the bearing pad 18 relative to a central position (when longitudinal and/or central axis Z is orthogonal to surface 29) of the bearing pad 18 is shown with broken lines. A longitudinal and/or central axis Z' of the piston 26 in a tilted position (see broken lines) having a tilting angle α relative to the longitudinal and/or central axis Z in central position. Preferably, the bearing pad 18 tilts relative to the longitudinal and/or central axis of the piston 26. A maximum tilt angle α of the bearing pad 18 relative to a central position of the bearing pad 18 may be between 0.5 and 2°, 1.5 and 3°, 2 and 5°, 3 and 10°, 5 and 15°, 10 and 20°, or 15 and 30°.

The end face 28 of the piston 26 has a curved shape which is configured to roll and/or slide on the surface 29 of the support structure 13 during tilting of the bearing pad 18 relative to the support structure 13.

Although the present invention has been described in accordance with preferred embodiments, it is obvious for the person skilled in the art that modifications are possible in all embodiments.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine, comprising a support structure and a thrust bearing having a bearing pad which comprises a piston and which is movably connected to the support structure, a spring element which is configured to resiliently support the bearing pad relative to the support structure, wherein a pad portion of the bearing pad and/or the bearing pad itself is configured to tilt and to move translationally relative to the support structure, and wherein a gap is provided between the piston and the support structure, wherein the spring element surrounds the piston and wherein the spring element comprises a disc spring and/or a polymer element.

2. The wind turbine according to claim 1, wherein the size and/or form of the gap varies depending on a movement of the pad portion and/or the bearing pad.

3. The wind turbine according to claim 1, wherein a movement of the pad portion and/or the bearing pad is limited by the piston.

4. The wind turbine according to claim 1, wherein the piston comprises an end face facing the gap, wherein the support structure comprises a surface which faces the gap and is arranged opposite to the end face of the piston, and wherein the end face of the piston has a curved shape which is configured to roll and/or slide on the surface of the support structure during tilting of the bearing pad relative to the support structure.

5. The wind turbine according to claim 1, wherein the pad portion is configured to tilt relative to the piston.

6. The wind turbine according to claim 1, wherein the pad portion and/or the bearing pad comprises a concave element and a corresponding convex element, wherein one of the concave element and the convex element is configured to slide, relative to the other of the concave element and the convex element, when the pad portion and/or the bearing pad is tilted relative to the support structure.

7. The wind turbine according to claim 1, wherein the thrust bearing comprises a pretension portion which is rigidly fixed to the support structure, and wherein the bearing pad is pretensioned against the pretension portion by the spring element.

8. The wind turbine according to claim 7, wherein the thrust bearing comprises a bottom portion which is arranged between and attached to the pretension portion and the support structure.

9. The wind turbine according to claim 8, further comprising a connector which protrude through the support structure and the bottom portion and which are fixed to the pretension portion.

10. The wind turbine according to claim 9, wherein the connector is screws.

* * * * *